United States Patent
Fukuda et al.

(10) Patent No.: US 10,526,427 B2
(45) Date of Patent: Jan. 7, 2020

(54) METHOD FOR PRODUCING SOLID CATALYST COMPONENT FOR α-OLEFIN POLYMERIZATION AND METHOD FOR PRODUCING α-OLEFIN POLYMER USING THE SAME

(71) Applicant: Japan Polypropylene Corporation, Chiyoda-ku (JP)

(72) Inventors: Keiji Fukuda, Mie (JP); Shouichi Ida, Mie (JP); Akio Tanna, Mie (JP); Shigeo Mizukami, Mie (JP)

(73) Assignee: Japan Polypropylene Corporation, Chiyoda-ku (JP)

( * ) Notice: Subject to any disclaimer, the term of this patent is extended or adjusted under 35 U.S.C. 154(b) by 0 days.

(21) Appl. No.: 16/063,042

(22) PCT Filed: Dec. 16, 2016

(86) PCT No.: PCT/JP2016/087595
§ 371 (c)(1),
(2) Date: Jun. 15, 2018

(87) PCT Pub. No.: WO2017/104817
PCT Pub. Date: Jun. 22, 2017

(65) Prior Publication Data
US 2018/0362673 A1    Dec. 20, 2018

(30) Foreign Application Priority Data

Dec. 18, 2015    (JP) .................................. 2015-247337

(51) Int. Cl.
*C08F 4/659*    (2006.01)
*C08F 4/609*    (2006.01)
(Continued)

(52) U.S. Cl.
CPC ........ *C08F 4/65912* (2013.01); *C08F 4/6093* (2013.01); *C08F 4/6498* (2013.01);
(Continued)

(58) Field of Classification Search
CPC combination set(s) only.
See application file for complete search history.

(56) References Cited

U.S. PATENT DOCUMENTS

| 4,780,443 A | 10/1988 | Matsuura et al. |
| 5,147,839 A | 9/1992 | Fujita et al. |

(Continued)

FOREIGN PATENT DOCUMENTS

| EP | 0 439 622 A1 | 8/1991 |
| EP | 3 255 067 A1 | 12/2017 |

(Continued)

OTHER PUBLICATIONS

Sinthusai et al., "Ziegler-Natta Catalyst with High Activity and Good Hydrogen Response," Journal of Metals, Materials and Minerals, vol. 19 No. 2, pp. 27-32 (2009). (Year: 2009).*

(Continued)

*Primary Examiner* — Catherine S Branch
(74) *Attorney, Agent, or Firm* — Oblon, McClelland, Maier & Neustadt, L.L.P.

(57) ABSTRACT

A method for producing a solid catalyst component (Aa) for α-olefin polymerization, which includes: bringing components (A1) to (A4) into contact with one another in an inert solvent; and without washing the contact product with an inert solvent, aging the contact product by keeping for a holding time of 3 days or more and 180 days or less, regarding the time point that all of the components (A1) to (A4) first come into contact, as a starting point.

12 Claims, 2 Drawing Sheets

(51) Int. Cl.
C08F 4/649 (2006.01)
C08F 110/06 (2006.01)
C08F 4/658 (2006.01)
C08F 10/00 (2006.01)

(52) U.S. Cl.
CPC .......... *C08F 4/658* (2013.01); *C08F 4/6591* (2013.01); *C08F 10/00* (2013.01); *C08F 110/06* (2013.01)

(56) References Cited

U.S. PATENT DOCUMENTS

| | | | |
|---|---|---|---|
| 5,177,043 | A | 1/1993 | Koyama et al. |
| 5,177,162 | A | 1/1993 | Matsuura et al. |
| 5,583,188 | A | 12/1996 | Kashiwa et al. |
| 5,965,478 | A | 10/1999 | Goto et al. |
| 8,232,358 | B2 | 7/2012 | Kobayashi et al. |
| 2009/0253873 | A1 | 10/2009 | Hosaka et al. |
| 2009/0259006 | A1 | 10/2009 | Kobayashi et al. |
| 2010/0099811 | A1 | 4/2010 | Kobayashi et al. |
| 2017/0369608 | A1 | 12/2017 | Kono et al. |

FOREIGN PATENT DOCUMENTS

| | | | |
|---|---|---|---|
| JP | 56-136806 A | | 10/1981 |
| JP | 58-138706 A | | 8/1983 |
| JP | 61-171715 A | | 8/1986 |
| JP | 62-187707 A | | 8/1987 |
| JP | 3-234707 A | | 10/1991 |
| JP | 7-2923 A | | 1/1995 |
| JP | 8-283329 A | | 10/1996 |
| JP | 11-80235 | | 3/1999 |
| JP | 2006-169283 A | | 6/2006 |
| JP | 2007-106939 A | | 4/2007 |
| JP | 2008-308558 A | | 12/2008 |
| JP | 2009-24074 A | | 2/2009 |
| JP | 2010-24394 | | 2/2010 |
| JP | 2013-227545 A | | 11/2013 |

OTHER PUBLICATIONS

Extended European Search Report dated Dec. 13, 2018 in Patent Application No. 16875791.2, 6 pages.
International Search Report dated Mar. 14, 2017 in PCT/JP2016/087595 filed Dec. 16, 2016.
Office Action dated Aug. 5, 2019 (received Aug. 14, 2019) in the corresponding Taiwanese Patent Application No. 105141950 (w/ English translation thereof).
Notice of Reasons for Refusal dated Oct. 17, 2019, in Japanese Patent Application No. 2016-244213 filed Dec. 16, 2016 (with English translation), citing documents AO and AP.

* cited by examiner

METHOD FOR PRODUCING SOLID CATALYST COMPONENT FOR α-OLEFIN POLYMERIZATION AND METHOD FOR PRODUCING α-OLEFIN POLYMER USING THE SAME

TECHNICAL FIELD

The present invention relates to a method for producing a solid catalyst component for α-olefin polymerization and a method for producing an α-olefin polymer using the same. More particularly, the invention relates to a method for producing a solid catalyst component for use in a catalyst showing sufficient performance in catalyst performance such as catalytic activity, specifically, a solid catalyst component showing good performance in all of catalytic activity, density and particle properties (particularly, polymer bulk density (BD)) of the resulting polymer, and a method for producing an α-olefin polymer using the same.

BACKGROUND ART

Polyolefins such as polyethylene and polypropylene are the most important plastic materials as industrial materials and are widely commonly used in packaging materials and electrical materials as extrusion-molded articles and the like, in industrial materials such as automobile parts and home appliances as injection-molded articles, and further, in a variety of applications such as fiber materials and building materials.

As such, since the use applications are extremely wide and are diversified, in polyolefins, from the viewpoints of their applications, the improvement and enhancement in various properties have been continuously sought and, in order to meet such demands, technical development has been achieved mainly by improving polymerization catalysts.

The catalytic activity has been enhanced by a Ziegler catalyst utilizing a transition metal compound and an organometallic compound, and thus industrial production has been realized. Thereafter, there have been made various improvements in performance, such as an improvement in polymer physical properties by controlling molecular weight distribution and an improvement in stable productivity in plants by controlling particle properties.

Specifically, there has been developed a catalyst using a solid catalyst component containing a magnesium compound as a catalyst support and titanium and halogen as essential components. Further, there have been proposed a catalyst showing enhanced catalytic activity and stereoregularity using an electron-donating compound (e.g., see Patent Document 1) and thereafter, a catalyst showing further enhanced catalytic activity and stereoregularity using a specific organosilicon compound (e.g., see Patent Documents 2 and 3).

Moreover, by using a silicon compound of a special structure having an alkenyl group such as a vinyl group or an allyl group in combination, in addition to the specific organosilicon compound, there has been proposed a catalyst having such performance improvements that not only the catalytic activity and stereoregularity are further improved but also response of hydrogen to be used as a molecular weight modifier is made satisfactory (e.g., see Patent Documents 4 to 6).

Furthermore, there has been also proposed a technique of catalyst increasing bulk density of the resulting polymer, improving particle properties, and enhancing productivity of the polymer by using a specific dialkoxymagnesium as a magnesium source (e.g., see Patent Document 7).

PRIOR ART DOCUMENTS

Patent Documents

Patent Document 1: JP-A-58-138706
Patent Document 2: JP-A-62-187707
Patent Document 3: JP-A-61-171715
Patent Document 4: JP-A-03-234707
Patent Document 5: JP-A-07-2923
Patent Document 6: JP-A-2006-169283
Patent Document 7: JP-A-08-283329

SUMMARY OF THE INVENTION

Problems that the Invention is to Solve

However, among all of these catalysts, there are no catalysts showing sufficient performance in all of catalytic activity, polymer density, and particle properties (particularly, polymer bulk density (BD)) for the resulting α-olefin polymer, and thus, it is desired to develop a technique for further improving catalyst performance.

In such circumstances of conventional techniques, an object of the present invention is to provide a solid catalyst component for α-olefin polymerization for a catalyst showing good performance in catalyst performance such as catalytic activity, specifically a catalyst showing good performance in all of catalytic activity, polymer density, and particle properties (particularly polymer bulk density (BD)), and a method for producing an α-olefin polymer using the same.

Means for Solving the Problems

In consideration of the above problems, the present inventors have performed overall consideration and search for properties of various catalyst components and chemical structures in Ziegler catalysts and have extensively studied a variety of catalyst components and production conditions thereof.

As a result, the inventors have found that a polymerization catalyst showing good performance in all of catalytic activity, polymer density, and particle properties (particularly polymer bulk density (BD)) is obtained by bringing a component (A1) containing titanium, magnesium, a halogen, and an electron-donating compound as essential components into contact with a silane compound having an alkenyl group (A2), an alkoxysilane compound (A3), and an organoaluminum compound (A4) and subsequently passing through a holding time of 3 days or more and 180 days or less. Based on these findings, they have accomplished the present invention.

That is, according to a first invention of the present invention, there is provided a method for producing a solid catalyst component (Aa) for α-olefin polymerization, which comprises:

bringing the following components (A1) to (A4) into contact with one another in an inert solvent to form a contact product; and without washing the contact product with an inert solvent, aging the contact product by keeping for a holding time of 3 days or more and 180 days or less, regarding the time point that all of the components (A1) to (A4) first come into contact, as a starting point:

Component (A1): a solid component containing titanium, magnesium, a halogen, and an electron-donating compound as essential components;

Component (A2): a silane compound having an alkenyl group;

Component (A3): an alkoxysilane compound which is different from the silane compound having an alkenyl group;

Component (A4): an organoaluminum compound.

Also, according to a second invention of the present invention, there is provided a method for producing a solid catalyst component (Ab) for α-olefin polymerization, which comprises:

bringing the following components (A1) to (A4) into contact with one another in an inert solvent to form a contact product;

without washing the contact product with an inert solvent, bringing the contact product into contact with an ethylenically unsaturated hydrocarbon, to perform a pre-polymerization treatment and form a pre-polymerization treatment product; and without washing the pre-polymerization treatment product with an inert solvent, aging the pre-polymerization treatment product by keeping for a holding time of 3 days or more and 180 days or less, regarding the time point that all of the components (A1) to (A4) first come into contact, as a starting point:

Component (A1): a solid component containing titanium, magnesium, a halogen, and an electron-donating compound as essential components;

Component (A2): a silane compound having an alkenyl group;

Component (A3): an alkoxysilane compound which is different from the silane compound having an alkenyl group;

Component (A4): an organoaluminum compound.

Also, according to a third invention of the present invention, there is provided the method for producing a solid catalyst component for α-olefin polymerization according to the first or second invention, wherein the holding time is 7 days or more and 90 days or less.

Further, according to a fourth invention of the present invention, there is provided the method for producing a solid catalyst component for α-olefin polymerization according to the first or second invention, wherein the component (A2) is a vinylsilane compound.

Further, according to a fifth invention of the present invention, there is provided the method for producing a solid catalyst component for α-olefin polymerization according to the first or second invention, wherein the component (A2) is a divinylsilane compound.

Further, according to a sixth invention of the present invention, there is provided the method for producing a solid catalyst component for α-olefin polymerization according to the first or second invention, wherein the contact product or the pre-polymerization treatment product at the time of holding is kept in the range where average temperature per day is 0° C. or higher and 60° C. or lower.

Also, according to a second invention of the present invention, there is provided a method for producing an α-olefin polymer, which comprises bringing an α-olefin into contact with a polymerization catalyst that contains a solid catalyst component for α-olefin polymerization produced by the method according to any one of the first to the sixth inventions and that may contain at least one selected from the group consisting of the following component (B) and the following component (C), to carry out a polymerization:

Component (B): an organoaluminum compound

Component (C): an alkoxysilane compound which is different from the silane compound having an alkenyl group.

Advantage of the Invention

A catalyst for α-olefin polymerization using the solid catalyst component for α-olefin polymerization to be produced by the method of the present invention has a higher catalytic activity and is more excellent in the yields at the time of polymerization as compared with conventional catalysts.

Moreover, an α-olefin polymer to be obtained by polymerization using the catalyst for α-olefin polymerization using the solid catalyst component for α-olefin polymerization to be produced according to the invention has a high polymer density and polymer bulk density (BD) and has excellent particle properties.

Therefore, the α-olefin polymer, according to the invention, shows high productivity in a plant, can be stably produced with high productivity in a plant and further is a polymer having higher mechanical strength.

MODES FOR CARRYING OUT THE INVENTION

Figure 1:
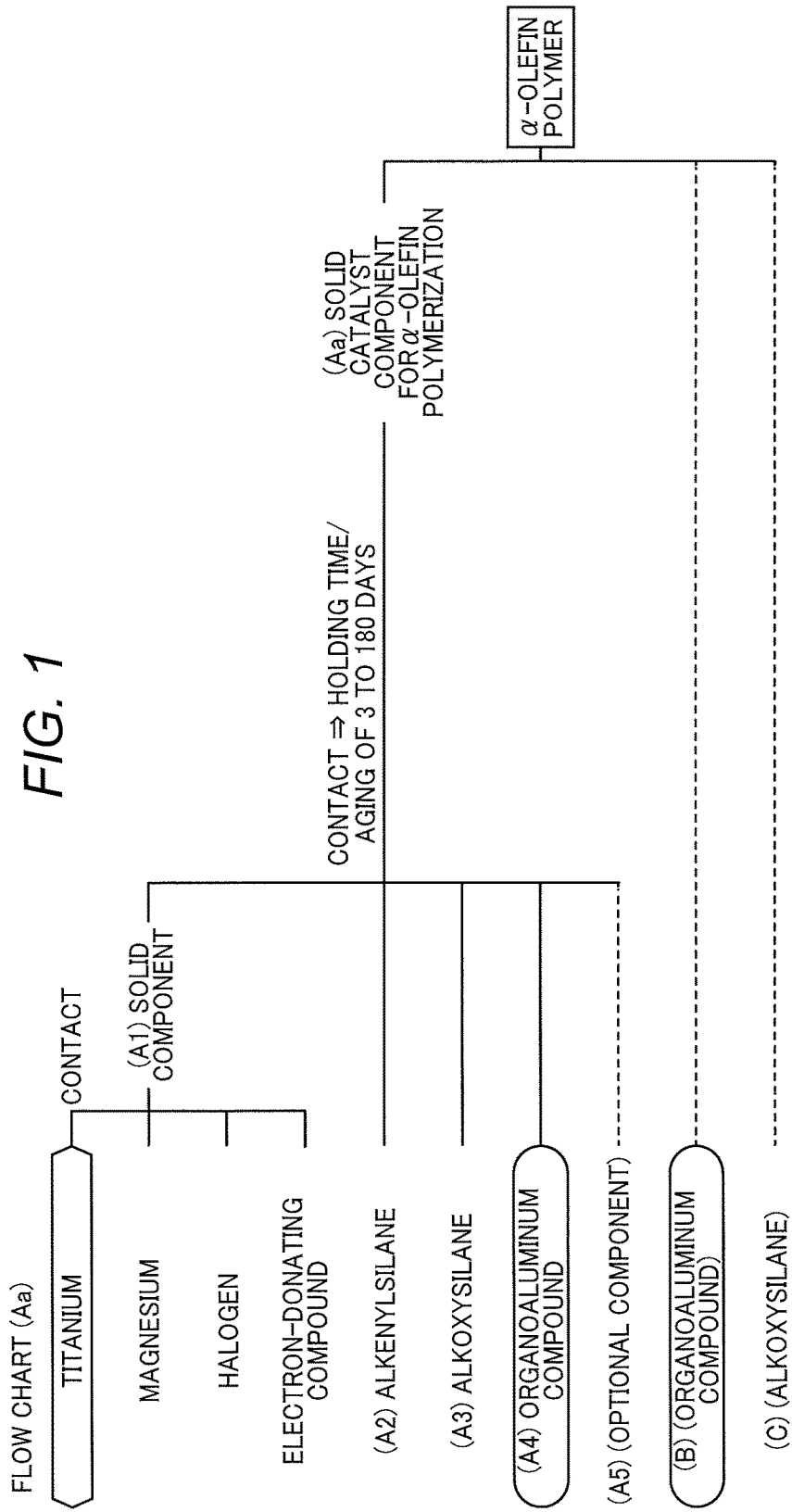
FIG. 1 is a flow chart for explaining the concept of the invention.
Figure 2:
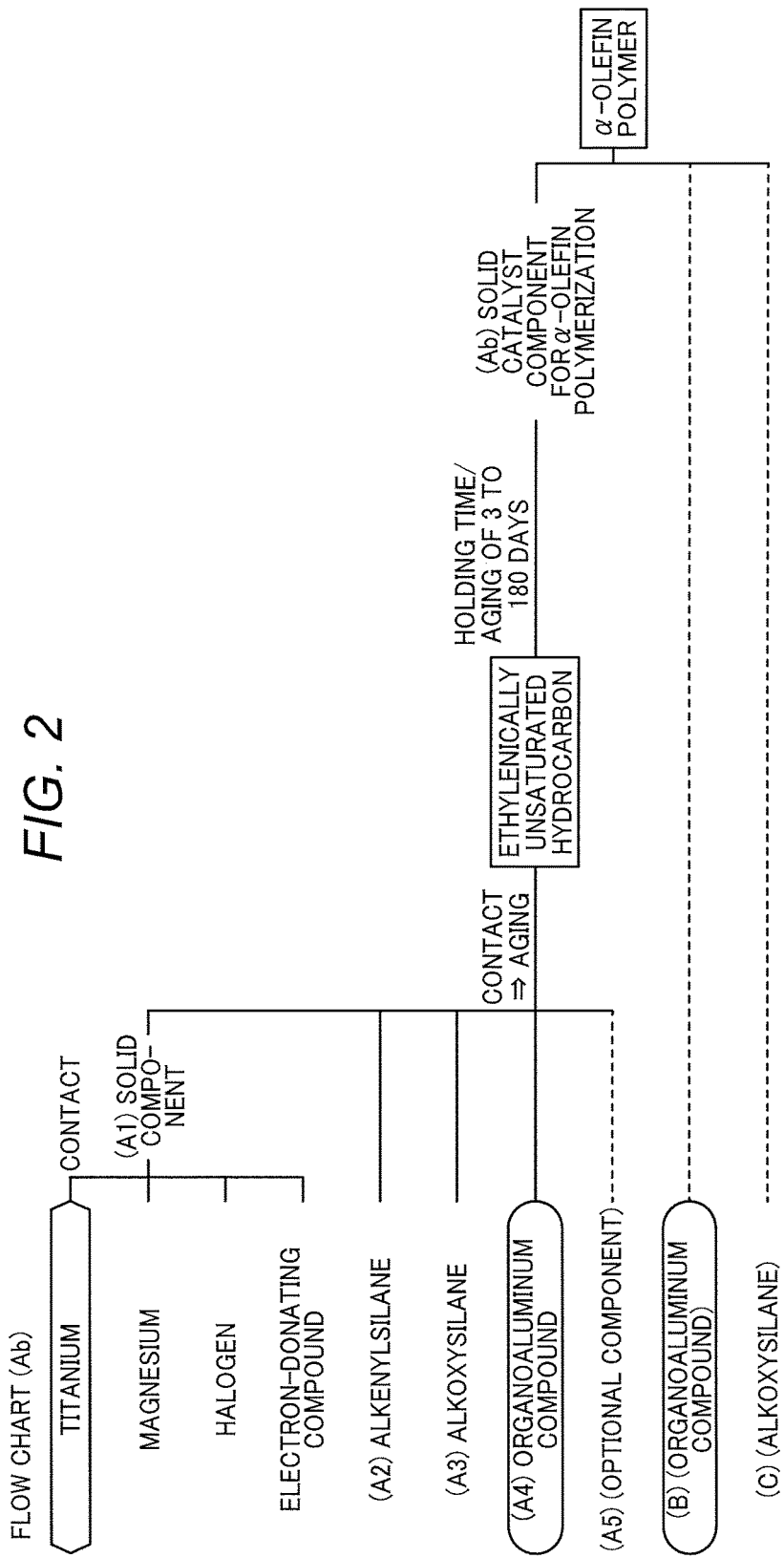
FIG. 2 is a flow chart for explaining the concept of the invention.

The following will explain the present invention for each item in detail.

1. Method for Producing Solid Catalyst Component (Aa) for α-Olefin Polymerization The present invention (first invention) is a method for producing a solid catalyst component (Aa) for α-olefin polymerization. The production method is characterized in that the following components (A1) to (A4) are brought into contact in an inert solvent to form a contact product, and the contact product is not washed with an inert solvent and is aged by keeping for a holding time of 3 days or more and 180 days or less, regarding the time point that all of the components (A1) to (A4) first come into contact, as a starting point:

Component (A1): a solid component containing titanium, magnesium, a halogen, and an electron-donating compound as essential components;

Component (A2): a silane compound having an alkenyl group;

Component (A3): an alkoxysilane compound, which is different from the silane compound having an alkenyl group];

Component (A4): an organoaluminum compound.

The following will describe each constituent component in detail.

(1) Component (A1)

The component (A1) to be used in the invention is a solid component containing titanium, magnesium, a halogen, and an electron-donating compound as essential components. Here, the term "containing . . . as essential components" means that an optional component may be contained in any form within a range where the advantages of the invention are not impaired.

(1-1) Titanium

As a titanium source to be used in the component (A1) according to the invention, an arbitrary titanium compound (A1a) can be used. As representative examples of the titanium compound (A1a), there can be mentioned compounds disclosed in JP-A-3-234707.

With regard to the valence of titanium, it is possible to use a titanium compound having arbitrary valent titanium, i.e., tetravalent, trivalent, bivalent, or 0-valent titanium, but it is possible to use preferably a titanium compound having tetravalent or trivalent titanium, further preferably a titanium compound having tetravalent titanium.

Specific examples of the titanium compounds having tetravalent titanium may include halogenated titanium compounds typified by titanium tetrachloride, alkoxytitanium compounds typified by tetrabutoxytitanium, condensed compounds of alkoxytitanium having a Ti—O—Ti bond typified by tetrabutoxytitanium dimer $(BuO)_3Ti—O—Ti(OBu)_3$, organometallic titanium compounds typified by dicyclopentadienyltitanium dichloride, and the like. Of these, titanium tetrachloride and tetrabutoxytitanium are particularly preferred.

Moreover, specific examples of the titanium compound having trivalent titanium may include halogenated titanium compounds typified by titanium trichloride. As titanium trichloride, it is possible to use compounds produced by any known methods, such as hydrogen reduction type one, metal aluminum reduction type one, metal titanium reduction type one, and organoaluminum reduction type one.

As for the above titanium compounds, it is possible to use not only the compound solely but also a plurality of the compounds in combination. Moreover, it is possible to use mixtures of the above titanium compounds, compounds in which the average compositional formula is a formula formed by mixing them (e.g., a compound such as $Ti(OBu)_mCl_{4-m}$; $0<m<4$), complexes with another compound such as a phthalic acid ester (e.g., a compound such as $Ph(CO_2Bu)_2 \cdot TiCl_4$), and the like.

(1-2) Magnesium

As a magnesium source to be used in the component (A1) according to the invention, an arbitrary magnesium compound (A1b) can be used. As representative examples of the magnesium compound (A1b), there can be mentioned compounds disclosed in JP-A-3-234707.

In general, it is possible to use halogenated magnesium compounds typified by magnesium chloride, alkoxymagnesium compounds typified by diethoxymagnesium, metal magnesium, oxymagnesium compounds typified by magnesium oxide, hydroxymagnesium compounds typified by magnesium hydroxide, Grignard compounds typified by butylmagnesium chloride, organomagnesium compounds typified by butylethylmagnesium, magnesium salt compounds of inorganic or organic acids typified by magnesium carbonate and magnesium stearate, and mixtures thereof and compounds in which the average compositional formula is a formula formed by mixing them (e.g., compounds such as $Mg(OEt)_mCl_{2-m}$; $0<m<2$), and the like.

Of these, magnesium chloride, diethoxymagnesium, metal magnesium, and butylmagnesium chloride are particularly preferred.

(1-3) Halogen

As the halogen to be used in the component (A1) according to the invention, it is possible to use fluorine, chlorine, bromine, iodine, or a mixture thereof. Of these, chlorine is particularly preferred.

The halogen is generally supplied from the above titanium compounds that are titanium sources and/or magnesium compounds that are magnesium sources but it is also possible to supply from another halogen compound (A1c). Representative examples of the other halogen compound (A1c) may include halogenated silicon compounds typified by silicon tetrachloride, halogenated aluminum compounds typified by aluminum chloride, halogenated organic compounds typified by 1,2-dichloroethane and benzyl chloride, halogenated borane compounds typified by trichloroborane, halogenated phosphorus compounds typified by phosphorus pentachloride, halogenated tungsten compounds typified by tungsten hexachloride, halogenated molybdenum compounds typified by molybdenum pentachloride, and the like. These compounds can be not only used solely but also used in combination. Of these, silicon tetrachloride is particularly preferred.

(1-4) Electron-Donating Compound

As the electron-donating compound (A1d) to be used in the component (A1) according to the invention, arbitrary one can be used. As representative examples of the electron-donating compound (A1d), there can be mentioned compounds disclosed in JP-A-2004-124090.

In general, it is preferred to use organic or inorganic acids and their derivatives (esters, acid anhydrides, acid halides, amides) compounds, ether compounds, ketone compounds, aldehyde compounds, alcohol compounds, amine compounds, and the like.

As the organic acids, it is possible to exemplify carboxylic acid compounds such as aromatic polybasic carboxylic acid compounds typified by phthalic acid, aromatic carboxylic acid compounds typified by benzoic acid, aliphatic polybasic carboxylic acid compounds typified by malonic acid having one or two substituents at the 2-position like 2-n-butylmalonic acid or succinic acid having one or two substituents at the 2-position like 2-n-butylsuccinic acid, and aliphatic carboxylic acid compounds typified by propionic acid; aromatic or aliphatic sulfonic acid compounds typified by benzenesulfonic acid and methanesulfonic acid; and the like.

Whether these carboxylic acid compounds and sulfonic acid compounds are aromatic ones or aliphatic ones, they may have any number of unsaturated bond(s) at any position in the molecule, like maleic acid.

As derivative compounds of the organic acids, it is possible to exemplify esters, acid anhydrides, acid halides, amides, and the like of the organic acids.

As the alcohol that is a constituent element of the ester, aliphatic or aromatic alcohols can be used. Of these alcohols, an alcohol composed of an aliphatic hydrocarbon group having 1 to 20 carbon atoms such as an ethyl group, a butyl group, an isobutyl group, a heptyl group, an octyl group, or a dodecyl group is preferred. Further, an alcohol composed of an aliphatic hydrocarbon group having 2 to 12 carbon atoms is preferred. Moreover, it is also possible to use an alcohol composed of an alicyclic hydrocarbon group such as a cyclopentyl group, a cyclohexyl group, or a cycloheptyl group.

As the halogen that is a constituent element of the acid halide, it is possible to use fluorine, chlorine, bromine, iodine, or the like. Of these, chlorine is most preferred. In the case of a polyhalide of a polybasic organic acid, the halogens may be the same or different.

As the amine that is a constituent element of the amide, it is possible to use aliphatic or aromatic amines. Of these amines, it is possible to exemplify ammonia, aliphatic amines typified by ethylamine and dibutylamine, amines having an aromatic hydrocarbon group in the molecule, typified by aniline and benzylamine, as preferred compounds.

As the inorganic acid, it is possible to exemplify carbonic acid, phosphoric acid, silic acid, sulfuric acid, nitric acid, and the like.

As the derivative compound of the inorganic acid, it is preferred to use esters of the inorganic acids. Tetraethoxysilane (ethyl silicate), tetrabutoxysilane (butyl silicate), tributyl phosphate, and the like may be mentioned as specific examples.

As the ether compounds, it is possible to exemplify aliphatic ether compounds typified by dibutyl ether, aromatic ether compounds typified by diphenyl ether, aliphatic polyvalent ether compounds typified by 1,3-dimethoxypropanes having one or two substituents at 2-position, such as 2-isopropyl-2-isobutyl-1,3-dimethoxypropane and 2-isopropyl-2-isopentyl-1,3-dimethoxypropane, polyvalent ether compounds having an aromatic hydrocarbon group in the molecule typified by 9,9-bis(methoxymethyl)fluorene, and the like.

As the ketone compounds, it is possible to exemplify aliphatic ketone compounds typified by methyl ethyl ketone, aromatic ketone compounds typified by acetophenone, polyvalent ketone compounds typified by 2,2,4,6,6-pentamethyl-3,5-heptanedione, and the liked.

As the aldehyde compounds, it is possible to exemplify aliphatic aldehyde compounds typified by propionaldehyde, aromatic aldehyde compounds typified by benzaldehyde, and the like.

As the alcohol compounds, it is possible to exemplify aliphatic alcohol compounds typified by butanol or 2-ethylhexanol, phenol derivative compounds typified by phenol and cresol, aliphatic or aromatic polyhydric alcohol compounds typified by glycerol and 1,1'-bis-2-naphthol, and the like.

As the amine compounds, it is possible to exemplify aliphatic amine compounds typified by diethylamine, nitrogen-containing alicyclic compounds typified by 2,2,6,6-tetramethyl-piperidine, aromatic amine compounds typified by aniline, polyvalent amine compounds typified by 1,3-bis(dimethylamino)-2,2-dimethylpropane, also nitrogen-containing aromatic compounds, and the like.

Further, as the electron-donating compound (A1d), it is also possible to use a compound containing a plurality of the above functional groups in the same molecule. As such compounds, it is possible to exemplify ester compounds having an alkoxy group in the molecule typified by 2-ethoxyethyl acetate and ethyl 3-ethoxy-2-t-butylpropionate, keto ester compounds typified by ethyl 2-benzoyl-benzoate, keto ether compounds typified by (1-t-butyl-2-methoxyethyl) methyl ketone, amino ether compounds typified by N,N-dimethyl-2,2-dimethyl-3-methoxypropylamine, halogeno ether compounds typified by epoxychloropropane, and the like.

As for these electron-donating compounds (A1d), it is possible to use not only the compound solely but also a plurality of the compounds in combination.

Of these, preferred are phthalic acid ester compounds typified by diethyl phthalate, dibutyl phthalate, diisobutyl phthalate, and diheptyl phthalate, phthalic acid halide compounds typified by phthaloyl dichloride, malonic acid ester compounds having one or two substituents at the 2-position, such as diethyl 2-n-butylmalonate, succinic acid ester compounds having one or two substituents at the 2-position or one or more substituents at each of the 2- and 3-positions typified by 2-n-butyl-diethyl succinate, aliphatic polyvalent ether compounds typified by a 1,3-dimethoxypropane having one or two substituents at the 2-position, such as 2-isopropyl-2-isobutyl-1,3-dimethoxypropane and 2-isopropyl-2-isopentyl-1,3-dimethoxypropane, polyvalent ether compounds having an aromatic hydrocarbon group in the molecule typified by 9,9-bis(methoxymethyl)fluorene, and the like.

(1-5) Preparation of Component (A1)

The amount of each component constituting the component (A1) according to the invention may be arbitrary in the range where the advantages of the invention are not impaired but, in general, the following range is preferred.

The amount of the titanium compound (A1a) to be used is, relative to the amount of the magnesium compound (A1b) to be used, in terms of a molar ratio (number of moles of titanium compound/number of moles of magnesium compound), preferably in the range of 0.0001 to 1,000, more preferably in the range of 0.001 to 100, more preferably in the range of 0.01 to 50.

In the case where a compound to be a halogen source (i.e. halogen compound (A1c)) is used in addition to the magnesium compound (A1b) and the titanium compound (A1a), the amount of the compound to be used is, relative to the amount of the magnesium compound (A1b) to be used, in terms of a molar ratio (number of moles of halogen compound/number of moles of magnesium compound), preferably in the range of 0.01 to 1,000, more preferably in the range of 0.1 to 100, whether each of the magnesium compound and the titanium compound contains a halogen or not.

The amount of the electron-donating compound (A1d) to be used is, relative to the amount of magnesium compound (A1b) to be used, in terms of a molar ratio (number of moles of the titanium compound/number of moles of the magnesium compound), preferably in the range of 0.001 to 10, more preferably in the range of 0.01 to 5.

The component (A1) according to the invention is preferably obtained by bringing the above-described constituting components into contact in the amounts mentioned above.

As the contact conditions for the components, any conditions can be used in the range where the advantages of the invention are not impaired. In general, they are preferably brought into contact under an inert gas atmosphere or in an inert solvent, and the following conditions are further preferred.

The contact temperature is −50 to 200° C., preferably 0 to 150° C. As the contact method, a method of achieving the contact by stirring in an inert solvent can be exemplified.

In the preparation of the component (A1), washing may be performed with an inert solvent in the middle or at the end.

As preferred inert solvents, it is possible to exemplify aliphatic hydrocarbon compounds such as heptane, aromatic hydrocarbon compounds such as toluene, and the like. These solvents may be used alone or two or more thereof may be used in combination.

Incidentally, as a method for preparing the component (A1) according to the invention, any methods can be used but, specifically, the methods described in the following can be exemplified. However, the invention is not limited at all by the following examples.

(i) Co-Milling Method

This is a method of supporting a titanium compound on a magnesium compound by co-milling a halogenated magnesium compound typified by magnesium chloride and a titanium compound. An electron-donating compound may be milled simultaneously or at a separate step. As a mill, any mill such as a rotary ball mill or a vibration mill can be used. As a milling method, it is possible to use not only a dry milling method where a solvent is not used but also a wet milling method where co-milling is performed in the presence of an inert solvent.

(ii) Heat Treatment Method

This is a method of supporting a titanium compound on a magnesium compound by subjecting a halogenated magnesium compound typified by magnesium chloride and a titanium compound to a contact treatment. An electron-donating compound may be subjected to the contact treatment simultaneously or at a separate step. In the case where a liquid compound such as titanium tetrachloride is used as the titanium compound, the contact treatment can be performed without an inert solvent. If necessary, optional components such as a halogenated silicon compound may be brought into contact simultaneously or at a separate step. The contact temperature is not particularly limited but it is often preferred to perform the contact treatment while heating to a relatively high temperature of 90° C. to 130° C.

(iii) Dissolution and Precipitation Method

This is a method including steps of dissolving a halogenated magnesium compound typified by magnesium chloride by bringing it into contact with an electron-donating compound and performing particle formation by bringing the formed solution into contact with a precipitating agent to cause a precipitation reaction.

Examples of the electron-donating compound to be used for the dissolution may include alcohol compounds, epoxy compounds, phosphoric acid ester compounds, silicon compounds having an alkoxy group, titanium compounds having an alkoxy group, ether compounds, and the like. Examples of the precipitating agent may include halogenated titanium compounds, halogenated silicon compounds, hydrogen chloride, halogen-containing hydrocarbon compounds, siloxane compounds having an Si—H bond (including polysiloxane compounds), aluminum compounds, and the like. As a contact method of the solution with the precipitating agent, the precipitation agent may be added to the solution or the solution may be added to the precipitating agent. In the case where a titanium compound is not used in either step of the dissolution and the precipitation, a titanium compound is supported on a magnesium compound by further bringing the particles formed by the precipitation reaction into contact with the titanium compound. If necessary, thus formed particles may be brought into contact with optional components such as a halogenated titanium compound, a halogenated silicon compound, and an electron-donating compound. On this occasion, the electron-donating compound may be different from that used for the dissolution or may be the same as the one. The contact order of these optional components is not particularly limited, and the contact may be performed as an independent step or the contact can also be simultaneously performed at the time of the dissolution, precipitation, or contact with the titanium compound. Also, in any steps of dissolution, precipitation, and contact with the optional components, an inert solvent may be present.

(iv) Granulation Method

This is a method including steps of dissolving a halogenated magnesium compound typified by magnesium chloride by bringing it into contact with an electron-donating compound in the same manner as in the dissolution and precipitation method and granulating the resulting solution mainly by a physical method.

Examples of the electron-donating compound to be used for the dissolution are the same as the examples thereof in the dissolution and precipitation method. Examples of the granulation method include a method of adding the solution at a high temperature into an inert solvent at a low temperature, a method of ejecting the solution toward a gas phase part at a high temperature from a nozzle to dry the solution, a method of ejecting the solution toward a gas phase part at a low temperature from a nozzle to cool the solution, and the like. By bringing the particles formed by granulating into contact with a titanium compound, the titanium compound is supported on a magnesium compound. Further, if necessary, thus formed particles may be brought into contact with an optional component such as a halogenated silicon compound or an electron-donating compound. At this time, the electron-donating compound may be different from that used for the dissolution or may be the same as the one. The contact order of these optional components is not particularly limited, and the contact may be performed as an independent step or the contact can also be simultaneously performed at the time of the dissolution or the contact with the titanium compound. Also, in any step of the dissolution, the contact with the titanium compound, and the contact with the optional components, an inert solvent may be present.

(v) Halogenation Method of Magnesium Compound

This is a method including a step of bringing a magnesium compound containing no halogen into contact with a halogenating agent to achieve halogenation.

Examples of the magnesium compound containing no halogen include alkoxymagnesium compounds, magnesium oxide, magnesium carbonate, magnesium salts of fatty acids, and the like. In the case of using a dialkoxymagnesium compound, it is also possible to use one prepared in situ by the reaction of metal magnesium with an alcohol. In the case of using this preparation method, it is common to perform grain formation by granulation or the like at the stage of the magnesium compound containing no halogen that is a starting material. Examples of the halogenating agent may include halogenated titanium compounds, halogenated silicon compounds, halogenated phosphorus compounds, and the like. In the case where a halogenated titanium compound is not used as the halogenating agent, a titanium compound is supported on a magnesium compound by bringing a halogen-containing magnesium compound formed by the halogenation into further contact with the titanium compound. The thus formed particles are brought into contact with an electron-donating compound. Further, if necessary, the thus formed particles may be brought into contact with an optional component such as a halogenated titanium compound or a halogenated silicon compound. The contact order of these optional components is not particularly limited, and the contact may be performed as an independent step or the contact can also be simultaneously performed at the time of the halogenation of the magnesium compound containing no halogen or the contact with the titanium compound. Also, in any step of the halogenation, the contact with the titanium compound, and the contact with the optional component, an inert solvent may be present.

(vi) Precipitation Method from Organomagnesium Compound

This is a method including a step of bringing a precipitating agent into contact with a solution of an organomagnesium compound such as a Grignard compound typified by butylmagnesium chloride or a dialkylmagnesium compound.

Examples of the precipitating agent may include titanium compounds, silicon compounds, hydrogen chloride, and the like. In the case where a titanium compound is not used as the precipitating agent, a titanium compound is supported on a magnesium compound by further bringing the particles formed by the precipitation reaction into contact with the titanium compound. The thus formed particles are brought into contact with an electron-donating compound. Further, if necessary, the thus formed particles may be brought into contact with an optional component such as a halogenated titanium compound or a halogenated silicon compound. The contact order of these optional components is not particularly limited, and the contact may be performed as an independent step or the contact can also be simultaneously performed at the time of the precipitation or the contact with the titanium compound. Also, in any steps of the precipitation, the contact with the titanium compound, and the contact with the optional components, an inert solvent may be present.

(vii) Impregnation Method

This is a method including a step of impregnating a support of an inorganic compound or a support of an organic compound with a solution of an organomagnesium compound or a solution obtained by dissolving a magnesium compound with an electron-donating compound.

Examples of the organomagnesium compound are the same as the examples in the precipitation method from the organomagnesium compound. The electron-donating compound to be used for the dissolution of the magnesium compound may or may not contain a halogen. Examples of the electron-donating compound are the same as the examples in the dissolution and precipitation method. In the case where the magnesium compound does not contain a halogen, a halogen is incorporated into the component (A1) by bringing the compound into contact with an optional component such as a halogenated titanium compound or a halogenated silicon compound to be described below.

Examples of the support of an inorganic compound may include silica, alumina, magnesia, and the like. Examples of the support of an organic compound may include polyethylene, polypropylene, polystyrene, and the like. On the support particles after the impregnation treatment, the magnesium compound is precipitated and immobilized by a chemical reaction with a precipitating agent or a physical treatment such as drying. Examples of the precipitating agent are the same as the examples in the dissolution and precipitation method. In the case where a titanium compound is not used as the precipitating agent, a titanium compound is supported on a magnesium compound by further bringing the thus formed particles into contact with the titanium compound. Further, if necessary, the thus formed particles may be brought into contact with an optional component such as a halogenated titanium compound or a halogenated silicon compound. The contact order of these optional components is not particularly limited, and the contact may be performed as an independent step or the contact can also be simultaneously performed at the time of the impregnation, the precipitation, the drying, or the contact with the titanium compound. Also, in any steps of the impregnation, the precipitation, the contact with the titanium compound, and the contact with the optional components, an inert solvent may be present.

(viii) Combination Method

The methods described in the above (i) to (vii) can be used in combination. Examples of the combination may include "a method of a heating treatment with the titanium halide compound after magnesium chloride is co-milled with an electron-donating compound", "a method of co-milling magnesium chloride compound with an electron-donating compound, subsequently dissolving them using another electron-donating compound, and further achieving precipitation using a precipitating agent", "a method of dissolving a dialkoxymagnesium compound with an electron-donating compound, precipitating it by bringing it into contact with a halogenated titanium compound, and simultaneously halogenating the magnesium compound", "a method of forming a carbonate ester of a magnesium compound and simultaneously dissolving it by bringing a dialkoxymagnesium compound into contact with carbon dioxide, impregnating silica with the formed solution, thereafter halogenating the magnesium compound and simultaneously precipitating and immobilizing it by bringing it into contact with hydrogen chloride, and supporting a titanium compound by further bringing it into contact with a halogenated titanium compound", and the like.

(2) Silane Compound Having Alkenyl Group (A2)

The silane compound having an alkenyl group (A2) to be used in the invention shows a structure in which at least one hydrogen atom of monosilane ($SiH_4$) is replaced by an alkenyl group (preferably an alkenyl group having 2 to 10 carbon atoms).

Moreover, it shows a structure in which the remaining hydrogen atoms are intact or some of the remaining hydrogen atoms are replaced by a halogen (preferably chlorine), an alkyl group (preferably a hydrocarbon group having from 1 to 12 carbon atoms), an aryl group (preferably a phenyl group), an alkoxy group (preferably an alkoxy group having 1 to 12 carbon atoms), or the like.

As the silane compound having an alkenyl group (A2) to be used in the invention, there may be mentioned compounds disclosed in JP-A-3-234707, JP-A-2003-292522, and JP-A-2006-169283, and the like.

More specifically, there may be exemplified vinylsilane, methylvinylsilane, dimethylvinylsilane, trimethylvinylsilane, trichlorovinylsilane, dichloromethylvinylsilane, chlorodimethylvinylsilane, chloromethylvinylsilane, triethylvinylsilane, chlorodiethylvinylsilane, dichloroethylvinylsilane, dimethylethylvinylsilane, diethylmethylvinylsilane, tripentylvinylsilane, triphenylvinylsilane, diphenylmethylvinylsilane, dimethylphenylvinylsilane, $CH_2$=CH—Si($CH_3$)$_2$($C_6H_4CH_3$), ($CH_2$=CH)($CH_3$)$_2$Si—O—Si($CH_3$)$_2$(CH=$CH_2$), divinylsilane, dichlorodivinylsilane, dimethyldivinylsilane, diphenyldivinylsilane, allyltrimethylsilane, allyltriethylsilane, allyltrivinylsilane, allylmethyldivinylsilane, allyldimethylvinylsilane, allylmethyldichlorosilane, allyltrichlorosilane, allyltribromosilanes, diallyldimethylsilane, diallyldiethylsilane, diallyldivinylsilane, diallylmethylvinylsilane, diallylmethylchlorosilane, diallyldichlorosilane, diallyldibromosilane, triallylmethylsilane, triallylethylsilane, triallylvinylsilane, triallylchlorosilane, triallylbromosilanes, tetraallylsilane, di-3-butenyldimethylsilane, di-3-butenyldiethylsilane, di-3-butenyldivinylsilane, di-3-butenylmethylvinylsilane, di-3-butenylmethylchlorosilane, di-3-butenyldichlorosilane, di-3-butenyldibromosilane, tri-3-butenylmethylsilane, tri-3-butenylethylsilane, tri-3-butenylvinylsilane, tri-3-butenylchlorosilane, tri-3-butenylbromosilane, tetra-3-butenylsilane, and the like.

Of these, vinylsilane compounds (silane compounds having a vinyl group) such as trimethylvinylsilane, trichlorovinylsilane, and dimethyldivinylsilane are preferred, and divinylsilane compounds (silane compounds having two vinyl groups) such as dimethyldivinylsilane are more preferred.

As for the silane compound having an alkenyl group (A2), it is possible to use not only the compound solely but also a plurality of the compounds in combination.

The amount of the silane compound having an alkenyl group (A2) to be used may be arbitrary in the range where the advantages of the invention are not impaired but, in general, the range shown below is preferred.

The amount of the silane compound having an alkenyl group (A2) to be used is, relative to the titanium constituting the component (A1), in terms of a molar ratio (number of moles of the silane compound having an alkenyl group (A2)/number of moles of the titanium atom), preferably in the range of 0.001 to 1,000, more preferably in the range of 0.01 to 100.

The silane compound having an alkenyl group (A2) to be used in the invention has usually large steric hindrance as compared with an α-olefin monomer, and thus cannot be polymerized with a Ziegler catalyst. However, owing to the presence of the organic silyl group having very strong electron-donating properties, the charge density of the carbon-carbon double bond portion is very high and coordination of the compound (A2) to the titanium atom that is an active center is considered to be very fast. Therefore, the silane compound having an alkenyl group (A2) is considered to have an effect of preventing the over-reduction of the titanium atom by an organoaluminum compound and the deactivation of the active site by impurities. However, such an action mechanism should not be construed as limiting the technical scope of the invention.

(3) Alkoxysilane Compound (A3)

As the alkoxysilane compound (A3) to be used in the invention, in general, preferred are compounds represented by the following general formula (1) and the like.

$$R^1R^2_mSi(OR^3)_n \quad (1)$$

wherein $R^1$ represents a hydrocarbon group or a heteroatom-containing hydrocarbon group; $R^2$ represents a hydrogen atom, a halogen atom, a hydrocarbon group, or a heteroatom-containing hydrocarbon group; $R^3$ represents a hydrocarbon group; showing $0 \leq m \leq 2$, $1 \leq n \leq 3$, and m+n=3.

In the general formula (1), $R^1$ represents a hydrocarbon group or a heteroatom-containing hydrocarbon group.

In the case where $R^1$ is a hydrocarbon group, the group is generally one having 1 to 20 carbon atoms, preferably one having 3 to 10 carbon atoms. Specific examples of the hydrocarbon group that can be used as $R^1$ may include linear aliphatic hydrocarbon groups typified by an n-propyl group, branched aliphatic groups typified by an isopropyl group and a t-butyl group, alicyclic hydrocarbon groups typified by a cyclopentyl group and a cyclohexyl group, aromatic hydrocarbon groups typified by a phenyl group, and the like. Of these, it is preferred to use a branched aliphatic hydrocarbon group or an alicyclic hydrocarbon group as $R^1$, especially, an isopropyl group, an isobutyl group, a t-butyl group, a thexyl group, a cyclopentyl group, a cyclohexyl group, or the like.

In the case where $R^1$ is a heteroatom-containing hydrocarbon group, the heteroatom is preferably selected from nitrogen, oxygen, sulfur, phosphorus, and silicon, and especially, the atom is preferably nitrogen or oxygen. The skeleton structure of the heteroatom-containing hydrocarbon group of $R^1$ is preferably selected from the examples in the case where $R^1$ is a hydrocarbon group. Especially, an N,N-diethylamino group, a quinolino group, an isoquinolino group, and the like are preferable.

In the general formula (1), $R^2$ represents a hydrogen atom, a halogen atom, a hydrocarbon group, or a heteroatom-containing hydrocarbon group.

As the halogen atom that can be used as $R^2$, there may be exemplified fluorine, chlorine, bromine, iodine, and the like.

In the case where $R^2$ is a hydrocarbon group, the group is generally one having 1 to 20 carbon atoms and preferably one having 1 to 10 carbon atoms. Specific examples of the hydrocarbon group that can be used as $R^2$ may include linear aliphatic hydrocarbon group typified by a methyl group and an ethyl group, branched aliphatic groups typified by an isopropyl group and a t-butyl group, alicyclic hydrocarbon groups typified by a cyclopentyl group and a cyclohexyl group, aromatic hydrocarbon groups typified by a phenyl group, and the like. Of these, preferred are a methyl group, an ethyl group, an n-propyl group, an isopropyl group, an isobutyl group, an s-butyl group, a t-butyl group, a thexyl group, a cyclopentyl group, a cyclohexyl group, and the like.

In the case where $R^2$ is a heteroatom-containing hydrocarbon group, it is preferably selected from the examples in the case where $R^1$ is a heteroatom-containing hydrocarbon group. Especially, an N,N-diethylamino group, a quinolino group, an isoquinolino group, and the like are preferred.

In the case where the value of m is 2, two $R^2$ groups may be the same or different. Further, regardless of the value of m, $R^2$ may be the same as or different from $R^1$.

In the general formula (1), $R^3$ represents a hydrocarbon group. $R^3$ is generally one having 1 to 20 carbon atoms, preferably one having 1 to 10 carbon atoms, and more preferably one having 1 to 5 carbon atoms. Specific examples of $R^3$ may include linear aliphatic hydrocarbon group typified by a methyl group and an ethyl group, branched aliphatic groups typified by an isopropyl group and a t-butyl group, and the like. Of these, preferred are a methyl group and an ethyl group. In the case where the value of n is 2 or more, a plurality of the $R^3$ groups may be the same or different.

Preferred examples of the alkoxysilane compound (A3) that can be used in the invention may include t-Bu(Me)Si(OMe)$_2$, t-Bu(Me)Si(OEt)$_2$, t-Bu(Et)Si(OMe)$_2$, t-Bu(n-Pr)Si(OMe)$_2$, c-Hex(Me)Si(OMe)$_2$, c-Hex(Et)Si(OMe)$_2$, c-Pen$_2$Si(OMe)$_2$, i-Pr$_2$Si(OMe)$_2$, i-Bu$_2$Si(OMe)$_2$, i-Pr(i-Bu)Si(OMe)$_2$, n-Pr(Me)Si(OMe)$_2$, t-BuSi(OEt)$_3$, (Et$_2$N)$_2$Si(OMe)$_2$, Et$_2$N—Si(OEt)$_3$,

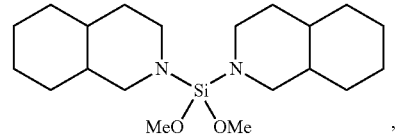

[Chem 1]

and the like.

Incidentally, in the Description, t-Bu represents a t-butyl group, Me represents a methyl group, Et represents an ethyl group, n-Pr represents an n-propyl group, c-Hex represents a cyclohexyl group, c-Pen represents a cyclopentyl group, i-Pr represents an isopropyl group, and i-Bu represents an isobutyl group.

As for the alkoxysilane compound (A3), it is possible to use not only the compound solely but also a plurality of the compounds in combination. Further, the alkoxysilane compound (A3) is different from the aforementioned silane compound having an alkenyl group (A2).

The amount of the alkoxysilane compound (A3) to be used may be arbitrary in the range where the advantages of the invention are not impaired but, in general, the range shown below is preferred.

The amount of the alkoxysilane compound (A3) to be used is, relative to the titanium constituting the component (A1), in terms of a molar ratio (number of moles of the alkoxysilane compound (A3)/number of moles of the titanium atom), preferably in the range of 0.01 to 1,000, more preferably in the range of 0.1 to 100.

The alkoxysilane compound (A3) to be used in the invention is considered to coordinate the vicinity of the titanium atom that may be the active center, for example, the Lewis acid site on the magnesium support or the like and to control the catalyst performance such as the catalytic activity and the tacticity of a polymer. However, such an action mechanism should not be construed as limiting the technical scope of the invention.

(4) Organoaluminum Compound (A4)

As the organoaluminum compound (A4) to be used in the invention, in general, preferred are compounds represented by the following general formula (2) and the like.

$$R^4_a AlX_b(OR^5)_c \quad (2)$$

wherein $R^4$ represents a hydrocarbon group, X represents a halogen atom or a hydrogen atom, $R^5$ represents a hydrocarbon group or a crosslinking group by Al, $1 \leq a \leq 3$, $0 \leq b \leq 2$, $0 \leq c \leq 2$, and $a+b+c=3$.

In the general formula (2), $R^4$ represents a hydrocarbon group. $R^4$ is preferably one having 1 to 10 carbon atoms, more preferably one having 1 to 8 carbon atoms, and particularly preferably one having 1 to 6 carbon atoms. Specific examples of $R^4$ may include a methyl group, an ethyl group, a propyl group, a butyl group, an isobutyl group, a hexyl group, an octyl group, and the like. Of these, a methyl group, an ethyl group, and an isobutyl group are most preferred.

In the general formula (2), X represents a halogen atom or a hydrogen atom. As the halogen atom that can be used as X, there may be exemplified fluorine, chlorine, bromine, iodine, and the like. Of these, chlorine is particularly preferred.

In the general formula (2), $R^5$ is a hydrocarbon group or a crosslinking group by Al. In the case where $R^5$ is a hydrocarbon group, $R^5$ can be selected from the same group as exemplified for the hydrocarbon group of $R^4$. Further, as the organoaluminum compound (A4), it is also possible to use alumoxane compounds typified by methylalumoxane and, in that case, $R^5$ represents a crosslinking group by Al.

Examples of the organoaluminum compound (A4) that can be used in the invention may include trimethylaluminum, triethylaluminum, triisobutylaluminum, trioctylaluminum, diethylaluminum chloride, ethylaluminum chloride, diethylaluminum ethoxide, methylalumoxane, and the like. Of these, triethylaluminum and triisobutylaluminum are preferred.

As for the organoaluminum compound (A4), it is possible to use not only the compound solely but also a plurality of the compounds in combination.

The amount of the organoaluminum compound (A4) to be used may be arbitrary in the range where the advantages of the invention are not impaired but, in general, the range shown below is preferred.

The amount of the organoaluminum compound (A4) to be used is, relative to the titanium constituting the component (A1), in terms of a molar ratio (number of moles of the aluminum atom/number of moles of the titanium atom), preferably in the range of 0.1 to 100, more preferably in the range of 1 to 50.

The organoaluminum compound (A4) to be used in the invention is used for the purpose of efficiently supporting the alkoxysilane compound (A3) in the contact product. Therefore, the compound is different in the intended use from the organoaluminum compound (B) to be used during the main polymerization as a co-catalyst and is distinguished therefrom.

(5) Compounds Having at Least Two Ether Bonds (A5)

In the invention, relative to the component (A1), optional components such as a compound having at least two ether bonds (A5) may be brought into contact in an arbitrary manner.

As the compound having at least two ether bonds (A5) that can be used in the invention, there may be mentioned compounds disclosed in JP-A-3-294302 and JP-A-8-333413. In general, preferred are compounds represented by the following general formula (3).

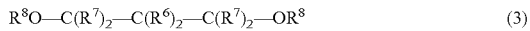
$$R^8O-C(R^7)_2-C(R^6)_2-C(R^7)_2-OR^8 \quad (3)$$

wherein, $R^6$ and $R^7$ represent a hydrogen atom, a hydrocarbon group, or a heteroatom-containing hydrocarbon group, and $R^8$ represents a hydrocarbon group or a heteroatom-containing hydrocarbon group.

In the general formula (3), $R^6$ represents a hydrogen atom, a hydrocarbon group, or a heteroatom-containing hydrocarbon group.

In the case where $R^6$ is a hydrocarbon group, $R^6$ is generally one having 1 to 20 carbon atoms, and preferably one having 1 to 10 carbon atoms. Specific examples of the hydrocarbon group that can be used as $R^6$ may include linear aliphatic hydrocarbon group typified by an n-propyl group, branched aliphatic groups typified by an isopropyl group and a t-butyl group, alicyclic hydrocarbon groups typified by a cyclopentyl group and a cyclohexyl group, aromatic hydrocarbon groups typified by a phenyl group, and the like. Of these, preferred is a branched aliphatic hydrocarbon group or an alicyclic hydrocarbon group, especially, an isopropyl group, an isobutyl group, an isopentyl group, a cyclopentyl group, a cyclohexyl group, and the like.

The two $R^6$ groups may be combined to form one or more rings. At this time, it is also possible to take a cyclopolyene-based structure containing two or three unsaturated bonds in the ring structure. Also, it may be condensed with another cyclic structure. Regardless of monocyclic, polycyclic, or presence or absence of condensation, one or more hydrocarbon groups may be present on the ring as a substituent. The substituent on the ring is generally one having 1 to 20 carbon atoms, and preferably one having 1 to 10 carbon atoms. Specific examples thereof may include linear aliphatic hydrocarbon group typified by an n-propyl group, branched aliphatic groups typified by an isopropyl group and a t-butyl group, alicyclic hydrocarbon groups typified by a cyclopentyl group and a cyclohexyl group, aromatic hydrocarbon groups typified by a phenyl group, and the like.

In the general formula (3), $R^7$ represents a hydrogen atom, a hydrocarbon group, or a heteroatom-containing hydrocarbon group. Specifically, $R^7$ may be selected from the examples of $R^6$. $R^7$ is preferably hydrogen.

In the general formula (3), $R^8$ represents a hydrocarbon group or a heteroatom-containing hydrocarbon group. Specifically, in the case where $R^8$ is a hydrocarbon group, it can be selected from the examples of $R^6$ that is a hydrocarbon group. $R^8$ is preferably a hydrocarbon group having 1 to 6 carbon atoms, more preferably an alkyl group. Most preferred is a methyl group.

In the case where $R^6$ to $R^8$ are each a heteroatom-containing hydrocarbon group, the heteroatom is preferably selected from nitrogen, oxygen, sulfur, phosphorus, and silicon. Moreover, whether $R^6$ to $R^8$ are each a hydrocarbon group or a heteroatom-containing hydrocarbon group, they may arbitrarily contain a halogen. In the case where $R^6$ to $R^8$ contain a heteroatom and/or halogen, the backbone structure is preferably selected from the examples in the case of a hydrocarbon group. Further, $R^6$ to $R^8$ may be the same as or different from one another.

Preferred examples of the compound having at least two ether bonds (A5) that can be used in the invention may include 2,2-diisopropyl-1,3-dimethoxypropane, 2,2-diisobutyl-1,3-dimethoxypropane, 2,2-diisobutyl-1,3-diethoxypropane, 2-isobutyl-2-isopropyl-1,3-dimethoxypropane, 2-isopropyl-2-isopentyl-1,3-dimethoxypropane, 2,2-dicyclopentyl-1,3-dimethoxypropane, 2,2-dicyclohexyl-1,3-dimethoxypropane, 2-isopropyl-1,3-dimethoxypropane, 2-tert-butyl-1,3-dimethoxypropane, 2,2-dipropyl-1,3-dimethoxypropane, 2-methyl-2-phenyl-1,3-dimethoxypropane, 9,9-bis(methoxymethyl)fluorene, 9,9-bis(methoxymethyl)-1,8-dichlorofluorene, 9,9-bis(methoxymethyl)-2,7-dicyclopentylfluorene, 9,9-bis(methoxymethyl)-1,2,3,4-tetrahydrofluorenc, 1,1-bis(1'-butoxyethyl)cyclopentadiene, 1,1-bis(α-methoxybenzyl)indene, 1,1-bis(phenoxymethyl)-3,6-dicyclohexylindene, 1,1-bis(methoxymethyl)benzonaphthene, 7,7-bis(methoxymethyl)-2,5-norbornadinen, and the like.

Of these, particularly preferred are 2,2-diisopropyl-1,3-dimethoxypropane, 2,2-diisobutyl-1,3-dimethoxypropane, 2-isobutyl-2-isopropyl-1,3-dimethoxypropane, 2-isopropyl-2-isopentyl-1,3-dimethoxypropane, 2,2-dicyclopentyl-1,3-dimethoxypropane, and 9,9-bis(methoxymethyl)fluorene.

As for the compound having at least two ether bonds (A5), it is possible to use not only the compound solely but also a plurality of the compounds in combination.

The compound having at least two ether bonds (A5) may be the same as or different from the polyvalent ether compound to be used as an electron-donating compound (A1d) that is an essential component in the component (A1).

The amount of the compound having at least two ether bonds (A5) to be used may be arbitrary within a range where the advantages of the invention are not impaired but, in general, the range shown below is preferred.

The amount of the compound having at least two ether bonds (A5) is, relative to the titanium constituting the component (A1), in terms of a molar ratio (number of moles of the compound having at least two ether bonds (A5)/ number of moles of the titanium atom), preferably in the range of 0.01 to 10,000, more preferably in the range of 0.5 to 500.

(6) Method for Producing Solid Catalyst Component (Aa) for α-Olefin Polymerization (6-1) Contact Product As for the solid catalyst component (Aa) for α-olefin polymerization in the invention, there is first included a step of obtaining a contact product by bringing the aforementioned component (A1), the silane compound having an alkenyl group (A2), the alkoxysilane compound (A3), and the organoaluminum compound (A4) into contact. On this occasion, another optional component such as the compound having at least two ether bonds (A5) or the like may be brought into contact in any manner within the range where the advantages of the invention are not impaired.

The constituent components (A1) to (A4) of the solid catalyst component (Aa) for α-olefin polymerization are brought into contact in an inert solvent to produce a contact product.

In one embodiment, the component (A2), the component (A3), and the contact component (A4) are brought into contact with the component (A1) in an inert solvent to produce a contact product.

They are preferably brought into contact in the absence of oxygen or the like and, the following conditions are further preferred.

The contact temperature is −50 to 200° C., preferably −10 to 100° C., more preferably 0 to 70° C., especially preferably from 10° C. to 60° C. The contact method is not limited as long as the contact is achieved in an inert solvent and it is possible to exemplify a mechanical method by means of a rotating ball mill or a vibration mill and a method of bringing them into contact by stirring, and the like. Of these, it is preferred to use a method of bringing them into contact by stirring in the presence of an inert solvent.

As preferred inert solvents, it is possible to exemplify aliphatic hydrocarbon compounds such as heptane, aromatic hydrocarbon compounds such as toluene, and the like. These solvents can be used alone or two or more thereof can be used in combination.

With respect to the contact procedure of the component (A1), the silane compound having an alkenyl group (A2), the alkoxysilane compound (A3), and the organoaluminum compound (A4), any procedure may be used. Specific examples include the following procedures (i) to (iv) but, of these, procedures (i) and (ii) are preferred.

Procedure (i): a method of bringing the silane compound having an alkenyl group (A2) into contact with the component (A1), then bringing the alkoxysilane compound (A3) into contact, and subsequently bringing the organoaluminum compound (A4) into contact.

Procedure (ii): a method of bringing the silane compound having an alkenyl group (A2) and the alkoxysilane compound (A3) into contact with the component (A1) and subsequently bringing the organoaluminum compound (A4) into contact.

Procedure (iii): a method of bringing the alkoxysilane compound (A3) into contact with the component (A1), then bringing the silane compound having an alkenyl group (A2) into contact, and subsequently bringing the organoaluminum compound (A4) into contact.

Procedure (iv): a method of bringing all the compounds into contact at the same time.

Also in the case where another optional component such as the compound having at least two ether bonds (A5) is used, the contact can be performed in any order as mentioned above.

Further, it is also possible to bring any of the component (A1), the silane compound having an alkenyl group (A2), the alkoxysilane compound (A3), and the organoaluminum compound (A4) into contact at arbitrary number of times. On this occasion, any of the silane compound having an alkenyl group (A2), the alkoxysilane compound (A3), and the organoaluminum compound (A4) to be used in multiple times of the contact may be the same or different from each other.

Moreover, although the preferred range of the amount of each component is shown before, this is the amount to be used per one time of the contact. When the component is used multiple times, it may be brought into contact any times in such an amount per one time of the contact that the aforementioned range of the amount is used as a guideline.

In the preparation of the solid catalyst component (Aa) for α-olefin polymerization, it is one characteristic of the invention that the contact product should not be washed with an inert solvent in the middle or at the end. However, each operation of dilution, concentration, or decantation for adjusting the volume may be performed. In the case of performing these operations, it is preferred that the concentration change of the contact product is preferably 0.01 times or more and 100 times or less, more preferably 0.1 times or more and 10 times or less. Further, there may be freely performed the operation of division or the like where the concentration is not changed.

(6-2) Aging

In the invention, it is an essential requirement to hold the contact product for a predetermined time to achieve aging. By the aging, the contact product is converted into the solid catalyst component (Aa) for α-olefin polymerization. Moreover, such an effect that the catalytic activity and the hydrogen responsibility are further increased is obtained by keeping for a certain holding time.

The aspect of the catalyst at the time of the holding is preferably an inert solvent slurry of the solid component (A) that is a contact product in a state that the components (A1) to (A4) remain in contact. However, each operation of dilution, concentration, or decantation for adjusting the volume may be performed. In the case of performing these operations, it is preferred that the concentration change of the contact product is preferably 0.01 times or more and 100 times or less, more preferably 0.1 times or more and 10 times or less. Further, there may be freely performed the operation of division or the like where the concentration is not changed.

The holding time is 3 days or more and 180 days or less, preferably 3 days or more and 90 days or less, more preferably 7 days or more and 90 days or less, regarding the time point that the components (A1) to (A4) are brought into contact, as a starting point (holding time=0). When the holding time is too short, catalyst performance is not brought out sufficiently. When it is too long, a decrease in performance is caused due to catalyst deterioration. The starting point of the holding time (start time) can also be said to be the time point that the components (A1) to (A4) first become in a co-present state.

The holding of the contact product is preferably performed under an environment of the absence of any poisoning substances such as molecular oxygen for avoiding the decomposition and the like of the catalyst components, and the other holding environmental conditions can be arbitrarily set. The contact product at the time of the holding is kept in a range of preferably 0° C. or higher and 60° C. or lower as average temperature per day.

During the holding time, the catalyst slurry may be or may not be stirred, and stirring and non-stirring may be combined. In the case where stirring is performed, it is possible to prevent the precipitation and subsequent aggregation of the catalyst. On the other hand, in the case where stirring is not performed, it is possible to prevent disintegration of the catalyst particles resulting from stirring and consequent generation of fine powder in the polymerization reactor. Light shielding may be or may not be performed.

Although the technical scope of the invention is not limited to the mechanism to be described later, there is described the invention's idea on the mechanism of the improvement in the catalyst performance by taking the holding time. That is, a putative mechanism is described.

In the invention, it is considered that the electron-donating compound in the component (A1) is first extracted out of the component (A1) through the reaction with the organoaluminum compound of the component (A4), then the alkoxysilane compound (A3) complements the vacancy thereof, and thereby there is obtained a contact product that is the base of a polymerization catalyst showing high activity and high stereoregularity. However, on this occasion, the reduction of titanium by the component (A4) simultaneously proceeds and it is not preferred to generate an over-reduced titanium species by the reduction. It is considered that the silane compound having an alkenyl group (A2) effectively acts for suppressing the over-reduction and protects titanium from the attack of the component (A4) through rapid coordination to the titanium.

In such a multistage reaction system and also in a complex reaction system containing side reactions that compete a part of the elementary reactions, it is natural that the reaction rates of individual elementary reactions are different from each other. Maximization of the desirable results according to the assumption may also be achieved by suppressing the rates of undesirable side reactions. The present inventors have recognized that the most undesirable side reaction is the over-reduction reaction of titanium with the organoaluminum compound, and have considered that the side reaction in question is most remarkable in the initial stage of the reaction and is negligibly little after the passage of a certain period of time.

Furthermore, as will be described later, it is considered that, after the contact treatment of the components (A1) to (A4), there is a possibility of further retarding the over-reduction of titanium by lowering the concentration of titanium in the solid component (A) through the incorporation of a pre-polymerization step of an ethylenic unsaturated compound.

The experimental results obtained by the inventors at this time can be explained along the above-described hypothesis, indicates that the desired reaction continues to proceed at a faster rate than side reactions after the first day of the holding time, and also showed that the effect becomes more remarkable by incorporating a pre-polymerization operation.

In the preceding techniques (Patent Documents 4 and 5), in order to prevent over-reduction of titanium with the organoaluminum compound, it can be read that it is a common knowledge to remove the unreacted organoaluminum compound by performing strict washing with an inert solvent within 1 day from the start of the contact treatment at the latest. Certainly, it is theoretically correct to remove the organoaluminum compound that is a causative substance of the over-reduction, but the component (A2) and the component (A3) are also removed at the same time and thereby desirable reactions are also stopped at the time point of the washing operation, so that a part of opportunities for the improvement in the catalyst performance is lost. The results confirmed by the present inventors at this time show that opportunity loss resulting from the washing operation is larger than conventional common knowledge of one skilled in the art.

As a result, the present inventors can reach the invention of a catalyst component showing higher performance by avoiding the washing step and securing a holding time of such a long period that is contrary to the conventional common knowledge.

2. Method for Producing Solid Catalyst Component (Ab) for α-Olefin Polymerization The present invention (second invention) is a method for producing a solid catalyst component (Ab) for α-olefin polymerization. This production method is characterized in that the following components (A1) to (A4) are brought into contact in an inert solvent to form a contact product, the contact product is brought into contact with an ethylenically unsaturated hydrocarbon in a state that the contact product is not washed with an inert solvent, to perform a pre-polymerization treatment and form a pre-polymerization treatment product, and the pre-polymerization treatment product is not washed with the inert solvent and is aged by keeping for a holding time of 3 days or more and 180 days or less, regarding the time point that all of the components (A1) to (A4) first come into contact, as a starting point:

Component (A1): a solid component containing titanium, magnesium, a halogen, and an electron-donating compound as essential components;

Component (A2): a silane compound having an alkenyl group;

Component (A3): an alkoxysilane compound which is different from the silane compound having an alkenyl group];

Component (A4): an organoaluminum compound.

In the method for producing a solid catalyst component (Ab) for α-olefin polymerization of the invention (second invention), the contact product is brought into contact with an ethylenically unsaturated hydrocarbon to perform a pre-polymerization treatment.

As the ethylenically unsaturated hydrocarbon in the pre-polymerization, there may be mentioned compounds disclosed in JP-A-2004-124090 and the like. Specifically, there may be mentioned olefins typified by ethylene, propylene, 1-butene, 3-methyl-1-butene, and 4-methyl-1-pentene, styrene analogous compounds typified by styrene, α-methylstyrene, allylbenzene, and chlorostyrene, diene compounds typified by 1,3-butadiene, isoprene, 1,3-pentadiene, 1,5-hexadiene, 2,6-octadiene, dicyclopentadiene, 1,3-cyclohexadiene, 1,9-decadiene, divinylbenzenes, etc., and the like. Of these, particularly preferred are ethylene, propylene, 3-methyl-1-butene, 4-methyl-1-pentene, styrene, divinylbenzenes, and the like.

As for the ethylenically unsaturated hydrocarbon, it is possible to use not only the compound solely but also a plurality of the compounds in combination.

With regard to the conditions of the reaction between the contact product and the ethylenically unsaturated hydrocarbon, any conditions may be used within a range where the advantages of the invention are not impaired. In general, the following ranges are preferred.

Based on 1 g of the contact product, the pre-polymerization amount is in the range of 0.001 to 100 g, preferably 0.1 to 50 g, and more preferably in the range of 0.5 to 10 g.

The reaction temperature at the pre-polymerization is preferably −150 to 150° C., more preferably 0 to 100° C. The reaction temperature at the pre-polymerization is preferably lower than the polymerization temperature at the main polymerization. In general, the reaction is preferably carried out under stirring and, at the time, an inert solvent such as hexane or heptane may be present. The pre-polymerization may be performed plural times, and the monomers used at this time may be the same or different.

In the method for producing a solid catalyst component (Ab) for α-olefin polymerization (second invention), in the case of performing the pre-polymerization, it is an essential requirement that the contact product after the pre-polymerization (pre-polymerization treatment product) is not washed with an inert solvent such as hexane or heptane. In the case where the washing with an inert solvent is performed here, a further improvement in the catalyst performance no longer occur during the holding time and thus the advantages of the invention cannot be obtained.

In the method for producing a solid catalyst component (Ab) for α-olefin polymerization (second invention), (1-1) Titanium, (1-2) Magnesium, (1-3) Halogen, (1-4) Electron-Donating Compound, (1-5) Preparation of Component (A1), (2) Silane Compound Having Alkenyl Group (A2), (3) Alkoxysilane Compound (A3), (4) Organoaluminum Compound (A4), (5) Compound Having at least Two Ether Bonds (A5), (6-1) Contact Product, (6-2) Aging, and the other descriptions in the explanation of the method for producing a solid catalyst component (Aa) for α-olefin polymerization (first invention) can be applied directly or with being appropriately modified.

Incidentally, in the method for producing a solid catalyst component (Ab) for α-olefin polymerization (second invention), the holding time can be assumed not to include the time required for the pre-polymerization treatment.

In the invention (second invention), it is an essential requirement that the pre-polymerization treatment product is aged by keeping for a certain time from the time point that all of the components (A1) to (A4) first come into contact. By the aging, the pre-polymerization treatment product is converted into the catalyst component (Ab) for α-olefin polymerization.

The aspect of the catalyst at the holding is preferably an inert solvent slurry of the pre-polymerization treatment product (A+) still in a state that the components (A1) to (A4) are brought into contact and thereafter subjected to the pre-polymerization treatment and only monomers are removed immediately after the completion of the pre-polymerization. However, each operation of dilution, concentration, or decantation for adjusting the liquid volume may be performed. In the case of performing these operations, it is preferred that the concentration change of the pre-polymerization treatment product (A+) is preferably 0.01 times or more and 100 times or less, more preferably 0.1 times or more and 10 times or less. Further, there may be freely performed the operation of division or the like where the concentration is not changed.

3. Catalyst for α-Olefin Polymerization

In the present invention (seventh invention), as the catalyst for α-olefin polymerization, it is an essential requirement to use the solid catalyst component (Aa) for α-olefin polymerization or the solid catalyst component (Ab) for α-olefin polymerization, and at least one selected from the group consisting of the organoaluminum compound (B) and the alkoxysilane compound (C) may be brought into contact as an optional component.

As the catalyst for α-olefin polymerization in the invention (seventh invention), there may be, for example, mentioned a polymerization catalyst containing the solid catalyst component (Aa) for α-olefin polymerization or the solid catalyst component (Ab) for α-olefin polymerization, a polymerization catalyst containing the solid catalyst component (Aa) for α-olefin polymerization or the solid catalyst component (Ab) for α-olefin polymerization and the organoaluminum compound (B), a polymerization catalyst containing the solid catalyst component (Aa) for α-olefin polymerization or the solid catalyst component (Ab) for α-olefin polymerization and the alkoxysilane compound (C), a polymerization catalyst containing the solid catalyst component (Aa) for α-olefin polymerization or the solid catalyst component (Ab) for α-olefin polymerization and the organoaluminum compound (B) and the alkoxysilane compound (C), and the like.

(1) Organoaluminum Compound (B)

As the organoaluminum compound (B) that can be used in the invention, there can be mentioned compounds disclosed in JP-A-2004-124090 and the like. Preferably, it is selected from the same group of the examples in the organoaluminum compound (A4) that is a component in the preparation of the solid catalyst component (Aa) for α-olefin polymerization or the solid catalyst component (Ab) for α-olefin polymerization. The kind of the organoaluminum compound (B) that can be used as a catalyst component may be the same as or different from the organoaluminum compound (A4) used in the preparation of the solid catalyst component (Aa) for α-olefin polymerization or the solid catalyst component (Ab) for α-olefin polymerization.

Further, as for the organoaluminum compound (B), it is possible to use not only the compound solely but also a plurality of the compounds in combination.

The amount of the organoaluminum compound (B) to be used is, relative to the titanium constituting the solid catalyst component (Aa) for α-olefin polymerization or the solid catalyst component (Ab) for α-olefin polymerization, in terms of a molar ratio (number of moles of the organoaluminum compound (B)/number of moles of the titanium atom), preferably in the range of 1 to 5,000, more preferably in the range of 10 to 500.

(2) Alkoxysilane Compound (C)

As the alkoxysilane compound (C) that can be used in the invention, there can be mentioned compounds disclosed in JP-A-2004-124090 and the like. Preferably, it is selected from the same group of the examples in the alkoxysilane compound (A3) that is a component in the preparation of the solid catalyst component (Aa) for α-olefin polymerization or the solid catalyst component (Ab) for α-olefin polymerization.

Moreover, the alkoxysilane compound (C) to be used here may be the same as or different from the alkoxysilane compound (A3) contained in the solid catalyst component (Aa) for α-olefin polymerization or the solid catalyst component (Ab) for α-olefin polymerization.

Further, as for the alkoxysilane compound (C), it is possible to use not only the compound solely but also a plurality of the compounds in combination.

The amount of the alkoxysilane compound (C) to be used in the case of using the compound is, relative to the titanium constituting the solid catalyst component (Aa) for α-olefin polymerization or the solid catalyst component (Ab) for α-olefin polymerization, in terms of a molar ratio (number of moles of the alkoxysilane compound (C)/number of moles of the titanium atom), preferably in the range of 0.01 to 10,000, more preferably in the range of 0.5 to 500.

(3) Optional Component in Catalyst

In the invention, although it is an essential requirement to use the solid catalyst component (Aa) for α-olefin polymerization or the solid catalyst component (Ab) for α-olefin polymerization, optional components such as the organoaluminum compound (B) and the alkoxysilane compound (C) can be used and, an optional component such as a compound having at least two ether bonds (D) to be described below can be further used in a range where the advantages of the invention are not impaired.

(3-1) Compound Having at Least Two Ether Bonds (D)

As the compound having at least two ether bonds (D) that can be used in the invention, there can be mentioned compounds disclosed in JP-A-3-294302 and JP-A-8-333413 and the like. Preferably, it is selected from the same group of the examples in the compound having at least two ether bonds (A5) that is used in the solid catalyst component (Aa) for α-olefin polymerization or the solid catalyst component (Ab) for α-olefin polymerization. On this occasion, the compound having at least two ether bonds (A5) that is used in the preparation of the solid catalyst component (Aa) for α-olefin polymerization or the solid catalyst component (Ab) for α-olefin polymerization may be the same as or different from the compound having at least two ether bonds (D) to be used as an optional component of the catalyst.

As for the compound having at least two ether bonds (D), it is possible to use not only the compound solely but also a plurality of the compounds in combination.

The amount of the compound having at least two ether bonds (D) to be used in the case of using the compound is, relative to the titanium constituting the solid catalyst component (Aa) for α-olefin polymerization or the solid catalyst component (Ab) for α-olefin polymerization, in terms of a molar ratio (number of moles of the compound having at least two ether bonds (D)/number of moles of the titanium atom), preferably in the range of 0.01 to 10,000, more preferably in the range of 0.5 to 500.

(3-2) Other Compound (E)

Unless the advantages of the invention are impaired, a component other than the organoaluminum compound (B), the alkoxysilane compound (C), and the compound having at least two ether bonds (D) can be used as an optional component of the catalyst (other compound (E)). For example, there may be mentioned a compound (E) having a C(=O)N bond in the molecule as disclosed in JP-A-2004-124090. By using the compound (E), it is possible to suppress the formation of amorphous components such as a cold xylene-soluble portion (CXS). Specifically, there may be mentioned tetramethylurea, 1,3-dimethyl-2-imidazolidinone, 1-ethyl-2-pyrrolidinone, and the like as preferable examples. Moreover, it is also possible to use an organometallic compound having a metal atom other than Al, such as diethylzinc.

The amount of the compound (E) having a C(=O)N bond in the molecule in the case of using the compound is, relative to the titanium constituting the solid catalyst component (Aa) for α-olefin polymerization or the solid catalyst component (Ab) for α-olefin polymerization, in terms of a molar ratio (number of moles of the compound (E) having a C(=O)N bond in the molecule/number of moles of the titanium atom), preferably in the range of 0.001 to 1,000, more preferably in the range of 0.05 to 500.

4. Polymerization of α-Olefin

In the method for producing an α-olefin polymer of the invention (seventh invention), the method is applied to slurry polymerization using a hydrocarbon solvent, liquid phase solvent-free polymerization using substantially no solvent, or gas-phase polymerization. As the polymerization solvent in the case of the slurry polymerization, a hydrocarbon solvent such as pentane, hexane, heptane, or cyclohexane can be used.

In particular, in the method for producing an α-olefin polymer of the invention, it is preferred to perform the gas-phase polymerization using a horizontal reactor having a stirrer that rotates around a horizontal axis inside the reactor.

The polymerization method to be employed may be any method such as continuous polymerization, batch polymerization, or multistage polymerization. The polymerization temperature is generally 30 to 200° C., preferably 50 to 150° C. Hydrogen can be used as a molecular weight modifier.

(1) α-Olefin Monomer Material

The α-olefin to be used in the method for producing the α-olefin polymer of the invention is represented by the following general formula (4).

$$R^9\text{—CH=CH}_2 \tag{4}$$

wherein $R^9$ is a hydrocarbon group having 1 to 20 carbon atoms, which may have a branch.

Specifically, the α-olefin is an α-olefin such as propylene, 1-butene, 1-pentene, 1-hexene, 4-methyl-1-pentene, or the like. In addition to homopolymerization of these α-olefins, it is also possible to perform (random) copolymerization with a monomer copolymerizable with the α-olefin (e.g., ethylene, an α-olefin, a diene, a styrene, or the like). Further, after, it is also possible to carry out block copolymerization in which homopolymerization is performed at the first stage and then random copolymerization is performed at the second stage. The copolymerizable monomer can be used up to 15% by weight in the random copolymerization and up to 50% by weight in the block copolymerization.

Of these, the homopolymerization and block copolymerization of the α-olefin are preferred and, in particular, most preferred are homopolymerization of propylene and block copolymerization in which the first stage is homopolymerization of propylene.

(2) α-Olefin Polymer

The properties of the α-olefin polymer polymerized according to the invention by polymerization is not particularly limited and can be suitably adjusted according to various applications.

In general, the melt flow rate (MFR) of the α-olefin polymer is preferably in the range of 0.01 to 10,000 g/10 minutes, more preferably 0.1 to 1,000 g/10 minutes.

Moreover, with regard to the amount of the cold xylene-soluble portion (CXS) that is an amorphous component of the α-olefin polymer, it is common that a preferred range of the amount varies depending on the application. For the applications where high rigidity is preferred, such as an injection molding application, the amount of CXS is preferably in the range of from 0.01 to 3.0% by weight, more preferably in the range of 0.05 to 1.5% by weight, still more preferably in the range of 0.1 to 1.0% by weight.

Here, the values of MFR and CXS are values measured by the methods defined in the following Examples.

The polymer particles of the α-olefin polymer obtained by the invention show excellent particle properties. In general, particle properties of the polymer particles are evaluated by polymer bulk density, particle size distribution, particle appearance, and the like.

The polymer bulk density (powder bulk density) of the polymer particles obtained by the invention is preferably in the range of 0.40 to 0.55 g/ml, more preferably 0.42 to 0.52 g/ml.

Here, the polymer bulk density is a value to be measured by the method defined in the following examples.

The α-olefin polymer polymerized according to the invention is produced in high yield, MFR, and polymer density and the particle properties are also satisfactory, so that it can be suitably used for an improvement in productivity and stable production in plants.

EXAMPLES

Hereinafter, the present invention will be described in more detail with reference to Examples, but the invention is not limited to these Examples. The methods for measuring individual physical property values in the invention are shown below.

5. Example (1) [Measurement of Various Physical Properties]

(1-1) MFR:

Using a melt indexer manufactured by Takara, it was evaluated under the conditions of 230° C. and 21.18 N (2.16 kg) based on JIS K6921.

(1-2) Polymer Bulk Density:

The polymer bulk density of a powder sample was measured using a device in accordance with ASTM D1895-69.

(1-3) CXS:

A sample (about 5 g) was once completely dissolved in p-xylene (300 ml) at 140° C. Then, the solution was cooled to 23° C. and a polymer was precipitated at 23° C. for 12 hours. After the precipitated polymer was filtrated off, p-xylene was evaporated from the filtrate. The remaining polymer after evaporation of the p-xylene was dried under reduced pressure at 100° C. for 2 hours. The polymer after drying was weighed and the value of CXS was obtained as % by weight relative to the sample.

(1-4) Density:

Using an extruded strand obtained at the time of MFR measurement, it was measured by a density gradient tube method in accordance with JIS K7112 D.

(1-5) Ti Content:

A samples were accurately weighed and was measured using a colorimetric method after hydrolysis. As for the sample after the pre-polymerization, the content was calculated using the weight excluding a preliminary polymerized polymer.

(1-6) Silicon Compound Content:

A sample was accurately weighed and was decomposed with methanol. By the comparison with a standard sample using gas chromatography, the silicon compound concentration in the resulting methanol solution was determined. From the silicon compound concentration in methanol and the weight of the sample, the content of the silicon compound contained in the sample was calculated. As for the sample after the pre-polymerization, the content was calculated using the weight excluding the preliminary polymerized polymer.

(2) [Preparation of Sample]

Example 1

(2-1) Preparation of Component (A1)

An autoclave having a volume of 10 L, which had been equipped with a stirring device, was thoroughly subjected to nitrogen substitution, and 2 L of purified toluene was introduced thereto. At room temperature, 200 g of $Mg(OEt)_2$ and 1 L of $TiCl_4$ were added thereto. The temperature was raised to 90° C. and 50 ml of di-n-butyl phthalate was introduced. Thereafter, the temperature was raised to 110° C. and the reaction was conducted for 3 hours. The reaction product was thoroughly washed with purified toluene. Then, the total liquid amount was adjusted to 2 L by introducing purified toluene. Further, 1 L of $TiCl_4$ was added at room temperature, the temperature was raised to 110° C., and the reaction was carried out for 2 hours. The reaction product was thoroughly washed with purified toluene. Then, the total liquid amount was adjusted to 2 L by introducing purified toluene. Further, 1 L of $TiCl_4$ was added at room temperature, the temperature was raised to 110° C., and the reaction was carried out for 2 hours. The reaction product was thoroughly washed with purified toluene. Furthermore, using purified n-heptane, the toluene was replaced by the n-heptane to obtain a slurry of a component (A1). A portion of the slurry was sampled and dried. When the sample was analyzed, the Ti content of the component (A1) was 2.7 wt %.

(2-2) Preparation of Solid Catalyst Component (Ab) for Olefin Polymerization

Then, purified n-heptane was introduced to adjust the liquid level so that the concentration of 4 g of the component (A1) became 20 g/L. Thereto were added 1.0 mL of dimethyldivinylsilane as a component (A2), 0.14 mL of $(i-Pr)_2Si(OMe)_2$ as a component (A3), and an n-heptane dilution of triethylaluminum in an amount of 1.7 g as triethylaluminum as a component (A4). The time point that the addition was performed was regarded as a starting point of the holding time. Thereafter, by carrying out the reaction at 30° C. for 2 hours, a slurry containing a solid component (A) as a contact product was obtained.

Using the slurry containing the solid component (A) obtained in the above, pre-polymerization was carried out by the following procedure. After the slurry was cooled to 10° C., 8 g of propylene was fed over a period of 15 minutes. After the feed of propylene was completed, the reaction was further continued for 10 minutes. Then, the gas phase part was thoroughly substituted with nitrogen. The resulting pre-polymerization treatment product (A+) contained 2.24 g of polypropylene per g of the solid component.

By holding the slurry containing the pre-polymerization treatment product (A+) obtained in the above at room temperature under a nitrogen atmosphere for 3 days in a state of no stirring, a slurry containing a solid catalyst component (Ab) for α-olefin polymerization was obtained.

(2-3) Polymerization of Propylene

A stainless steel-made autoclave having an inner volume of 3.0 L, which had been equipped with stirring and temperature-controlling devices, was heated and dried under vacuum, cooled to room temperature, and subjected to propylene substitution. Thereafter, 550 mg of triethylaluminum as a component (B), 85.1 mg of $(i-Pr)_2Si(OMe)_2$ as a component (C), and 8,000 ml of hydrogen were introduced. Then, 750 g of liquid propylene was introduced and, after the internal temperature was adjusted to 70° C., 5 mg of the above solid catalyst component (Ab) for α-olefin polymerization was pressed therein to polymerize propylene. After 1 hour, the polymerization was terminated by pressing 10 ml of ethanol therein. The polymer was dried and weighed. The results are shown in Table 1.

Example 2

Exactly the same operations were performed as in Example 1 except that the holding time was changed to 9 days. The results are shown in Table 1.

Example 3

Exactly the same operations were performed as in Example 1 except that the holding time was changed to 14 days. The results are shown in Table 1.

Example 4

Exactly the same operations were performed as in Example 1 except that the holding time was changed to 29 days. The results are shown in Table 1.

Example 5

Exactly the same operations were performed as in Example 1 except that the holding time was changed to 50 days. The results are shown in Table 1.

Comparative Example 1

Exactly the same operations were performed as in Example 1 except that the holding time was changed to 1 day. The results are shown in Table 2.

Comparative Example 2

Exactly the same operations were performed as in Example 2 except that, at the time of preparing the pre-polymerization treatment product (A+), the pre-polymerization treatment product (A+) was thoroughly washed with purified n-heptane immediately after the pre-polymerization was finished and the slurry, into which n-heptane was introduced so that the liquid level returned to the original level, was held for 9 days. The results are shown in Table 2.

Comparative Example 3

Exactly the same operations were performed as in Example 2 except that the component (A2) and the component (A3) were not used at the time of preparing the solid component (A). The results are shown in Table 2. In the example, a time point that 1.7 g of triethylaluminum was added was regarded as a starting point of the holding time.

Example 6

Exactly the same operations were performed as in Example 1 except that trimethylvinylsilane (2.0 mL) was used instead of dimethyldivinylsilane and the holding time was changed to 9 days in (2-2) of Example 1. The resulting pre-polymerization treatment product (A+) contained 2.25 g of polypropylene per g of the solid component.

Further, polymerization was carried out in the same manner as in Example 1. The results are shown in Table 3.

Comparative Example 4

Exactly the same operations were performed as in Example 6 except that the holding time was changed to 1 day. The results are shown in Table 3.

Example 7

Exactly the same operations were performed as in Example 1 except that t-BuMeSi(OEt)$_2$ (0.14 mL) was used instead of (i-Pr)$_2$Si(OMe)$_2$ and the holding time was changed to 9 days in (2-2) of Example 1. The resulting pre-polymerization treatment product (A+) contained 2.02 g of polypropylene per g of the solid component.

Further, polymerization was carried out in the same manner as in Example 1. The results are shown in Table 3.

Comparative Example 5

Exactly the same operations were performed as in Example 7 except that the holding time was changed to 1 day. The results are shown in Table 3.

Example 8

Exactly the same operations were performed as in Example 6 except that the holding time was changed to 50 days. The results are shown in Table 3.

Example 9

Exactly the same operations were performed as in Example 7 except that the holding time was changed to 50 days. The results are shown in Table 3.

TABLE 1

| | | | Example 1 | Example 2 | Example 3 | Example 4 | Example 5 |
|---|---|---|---|---|---|---|---|
| Catalyst preparing conditions | Compound (A2) | compound name | dimethyl-divinylsilane | dimethyl-divinylsilane | dimethyl-divinylsilane | dimethyl-divinylsilane | dimethyl-divinylsilane |
| | Compound (A3) | compound name | (i-Pr)$_2$Si(OMe)$_2$ | (i-Pr)$_2$Si(OMe)$_2$ | (i-Pr)$_2$Si(OMe)$_2$ | (i-Pr)$_2$Si(OMe)$_2$ | (i-Pr)$_2$Si(OMe)$_2$ |
| | Washing | yes or no | no | no | no | no | no |
| | Holding time | day(s) | 3 | 9 | 14 | 29 | 50 |
| Polymerization conditions | Propylene | g | 750 | 750 | 750 | 750 | 750 |
| | Amount of hydrogen | mL | 8,000 | 8,000 | 8,000 | 8,000 | 8,000 |
| | Temperature | ° C. | 70 | 70 | 70 | 70 | 70 |
| | Time | hour | 1 | 1 | 1 | 1 | 1 |
| Polymerization results | Catalytic activity | g/g-catalyst | 58,900 | 61.300 | 64,000 | 63,300 | 60,000 |
| | MFR | g/10 minutes | 85.6 | 95.9 | 92.9 | 92.9 | 89.7 |
| | Polymer bulk density | g/mL | 0.43 | 0.43 | 0.43 | 0.43 | 0.44 |
| | Polymer density | g/mL | 0.9084 | 0.9084 | 0.9085 | 0.9084 | 0.9084 |

TABLE 2

| | | | Comparative Example 1 | Comparative Example 2 | Comparative Example 3 |
|---|---|---|---|---|---|
| Catalyst preparing conditions | Compound (A2) | compound name | dimethyl-divinylsilane | dimethyl-divinylsilane | none |
| | Compound (A3) | compound name | (i-Pr)$_2$Si(OMe)$_2$ | (i-Pr)$_2$Si(OMe)$_2$ | none |
| | Washing | yes or no | no | yes | no |
| | Holding time | day(s) | 1 | 9 | 9 |
| Polymerization conditions | Propylene | g | 750 | 750 | 750 |
| | Amount of hydrogen | mL | 8,000 | 8,000 | 8,000 |
| | Temperature | ° C. | 70 | 70 | 70 |
| | Time | hour | 1 | 1 | 1 |
| Polymerization results | Catalytic activity | g/g-catalyst | 53,600 | 50,700 | 30,200 |
| | MFR | g/10 minutes | 80.5 | 62.9 | 49.3 |
| | Polymer bulk density | g/mL | 0.41 | 0.45 | 0.45 |
| | Polymer density | g/mL | 0.9078 | 0.9078 | 0.9075 |

TABLE 3

| | | | Example 6 | Comparative Example 4 | Example 7 | Comparative Example 5 | Example 8 |
|---|---|---|---|---|---|---|---|
| Catalyst preparing conditions | Compound (A2) | compound name | trimethyl-vinylsilane | trimethyl-vinylsilane | dimethyl-divinylsilane | dimethyl-divinylsilane | trimethyl-vinylsilane |
| | Compound (A3) | compound name | (i-Pr)$_2$Si(OMe)$_2$ | (i-Pr)$_2$Si(OMe)$_2$ | t-BuMeSi(OEt)$_2$ | (t-BuMeSi(OEt)$_2$ | (i-Pr)$_2$Si(OMe)$_2$ |
| | Washing | yes or no | no | no | no | no | no |
| | Holding time | day(s) | 9 | 1 | 9 | 1 | 50 |
| Polymerization conditions | Propylene | g | 750 | 750 | 750 | 750 | 750 |
| | Amount of hydrogen | mL | 8,000 | 8,000 | 8,000 | 8,000 | 8,000 |
| | Temperature | ° C. | 70 | 70 | 70 | 70 | 70 |
| | Time | hour | 1 | 1 | 1 | 1 | 1 |
| Polymerization results | Catalytic activity | g/g-catalyst | 41,200 | 30,700 | 64,000 | 46,300 | 45,700 |
| | MFR | g/10 minutes | 90.4 | 76.8 | 97.3 | 90.4 | 81.1 |
| | Polymer bulk density | g/mL | 0.40 | 0.36 | 0.44 | 0.41 | 0.39 |
| | Polymer density | g/mL | 0.9086 | 0.9086 | 0.9085 | 0.9085 | 0.9086 |

(3) [Consideration of Evaluation Results of Examples and Comparative Examples]

As apparent from the above tables, by comparing and considering Examples 1 to 9 and Comparative Examples 1 to 5, it is revealed that the catalytic activity of the catalysts of the invention is wholly excellent as compared with the cases of Comparative Examples.

Specifically, from Examples 1 to 5 and Comparative Example 1, by setting an appropriate holding time, it is revealed that the catalytic activity and hydrogen responsibility of the catalyst is greatly improved. Moreover, from the polymer bulk density, it is revealed that particle properties are also improved.

Further, from Example 2 and Comparative Example 2, in order to exhibit the effect resulting from the above holding time, it is revealed that it is necessary not to wash the solid component (A) that is a contact product and the pre-polymerization treatment product (A+).

Still further, from Example 2 and Comparative Example 3, in order to exhibit the effect resulting from the holding time, it is revealed that the presence of the components (A2) and (A3) are necessary.

Moreover, from Examples 6 and 8 and Comparative Example 4, even in the case where the component (A2) according to the invention is changed, it is revealed that the expression of equivalent performance can be confirmed.

Furthermore, from Examples 7 and 9 and Comparative Example 5, even in the case where the component (A3) is changed, it is revealed that the expression of equivalent performance can be confirmed.

Thus, it can be said that the catalyst of each Example of the invention is a catalyst having a very high catalytic activity and hydrogen responsibility while maintaining the basic performance such as stereoregularity at a high level, and excellent results are obtained as compared with the cases of Comparative Examples.

While the invention has been described in detail and with reference to specific embodiments thereof, it will be apparent to one skilled in the art that various changes and modifications can be made therein without departing from the spirit and scope thereof. The present application is based on Japanese Patent Application No. 2015-247337 filed on Dec. 18, 2015, and the contents are incorporated herein by reference.

INDUSTRIAL APPLICABILITY

The catalyst for α-olefin polymerization obtained using the present invention has high performance in all of catalyst performance, such as catalytic activity, hydrogen responsibility, polymer density, and polymer bulk density, enhances productivity of an α-olefin polymer, and can reduce production costs, so that the catalyst has industrially high availability.

Moreover, the α-olefin polymer obtained using the catalyst of the invention, particularly polypropylene can be suitably used injection molding applications typified by automobile parts and home appliance parts, extrusion molding applications typified by biaxially oriented films, fibers typified by spunbonded ones, and the like.

The invention claimed is:

1. A method for producing a solid catalyst component (Aa) for α-olefin polymerization, which comprises:
   bringing the following components (A1) to (A4) into contact with one another in an inert solvent to form a contact product; and
   without washing the contact product with an inert solvent, aging the contact product by keeping for a holding time of 3 days or more and 180 days or less, regarding the time point that all of the components (A1) to (A4) first come into contact, as a starting point:
   Component (A1): a solid component containing titanium, magnesium, a halogen, and an electron-donating compound as essential components;
   Component (A2): a silane compound having an alkenyl group;
   Component (A3): an alkoxysilane compound which is different from the silane compound having an alkenyl group;
   Component (A4): an organoaluminum compound.

2. A method for producing a solid catalyst component (Ab) for α-olefin polymerization, which comprises:
   bringing the following components (A1) to (A4) into contact with one another in an inert solvent to form a contact product;
   without washing the contact product with an inert solvent, bringing the contact product into contact with an ethylenically unsaturated hydrocarbon, to perform a pre-polymerization treatment and form a pre-polymerization treatment product; and
   without washing the pre-polymerization treatment product with an inert solvent, aging the pre-polymerization treatment product by keeping for a holding time of 3 days or more and 180 days or less, regarding the time point that all of the components (A1) to (A4) first come into contact, as a starting point:

Component (A1): a solid component containing titanium, magnesium, a halogen, and an electron-donating compound as essential components;

Component (A2): a silane compound having an alkenyl group;

Component (A3): an alkoxysilane compound which is different from the silane compound having an alkenyl group;

Component (A4): an organoaluminum compound.

3. The method for producing a solid catalyst component for α-olefin polymerization according to claim 1, wherein the holding time is 7 days or more and 90 days or less.

4. The method for producing a solid catalyst component for α-olefin polymerization according to claim 1, wherein the component (A2) is a vinylsilane compound.

5. The method for producing a solid catalyst component for α-olefin polymerization according to claim 1, wherein the component (A2) is a divinylsilane compound.

6. The method for producing a solid catalyst component for α-olefin polymerization according to claim 1, wherein the contact product or the pre-polymerization treatment product at the time of holding is kept in the range where average temperature per day is 0° C. or higher and 60° C. or lower.

7. A method for producing an α-olefin polymer, which comprises bringing an α-olefin into contact with a polymerization catalyst comprising a solid catalyst component for α-olefin polymerization produced by the method according to claim 1 and optionally comprising at least one selected from the group consisting of the following component (B) and the following component (C), to carry out a polymerization:

Component (B): an organoaluminum compound

Component (C): an alkoxysilane compound which is different from the silane compound having an alkenyl group.

8. A method for producing an α-olefin polymer, which comprises bringing an α-olefin into contact with a polymerization catalyst comprising a solid catalyst component for α-olefin polymerization produced by the method according to claim 2 and optionally comprising at least one selected from the group consisting of the following component (B) and the following component (C), to carry out a polymerization:

Component (B): an organoaluminum compound

Component (C): an alkoxysilane compound which is different from the silane compound having an alkenyl group.

9. The method for producing a solid catalyst component for α-olefin polymerization according to claim 2, wherein the holding time is 7 days or more and 90 days or less.

10. The method for producing a solid catalyst component for α-olefin polymerization according to claim 2, wherein the component (A2) is a vinylsilane compound.

11. The method for producing a solid catalyst component for α-olefin polymerization according to claim 2, wherein the component (A2) is a divinylsilane compound.

12. The method for producing a solid catalyst component for α-olefin polymerization according to claim 2, wherein the contact product or the pre-polymerization treatment product at the time of holding is kept in the range where average temperature per day is 0° C. or higher and 60° C. or lower.

* * * * *